(12) United States Patent
Choi et al.

(10) Patent No.: US 10,362,123 B2
(45) Date of Patent: Jul. 23, 2019

(54) SYSTEM AND METHOD FOR ENDPOINT DISCOVERY BASED ON DATA DISTRIBUTION SERVICE

(71) Applicant: The Industry & Academic Cooperation in Chungnam National University (IAC), Daejeon (KR)

(72) Inventors: Hoon Choi, Daejeon (KR); Gunjae Yoon, Daejeon (KR); Shineun Lee, Seoul (KR)

(73) Assignee: THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 260 days.

(21) Appl. No.: 15/404,438

(22) Filed: Jan. 12, 2017

(65) Prior Publication Data

US 2017/0208140 A1 Jul. 20, 2017

(30) Foreign Application Priority Data

Jan. 14, 2016 (KR) .................. 10-2016-0004886

(51) Int. Cl.
*G06F 15/16* (2006.01)
*H04L 29/08* (2006.01)
*H04L 12/24* (2006.01)

(52) U.S. Cl.
CPC ........ *H04L 67/16* (2013.01); *H04L 29/08072* (2013.01); *H04L 41/12* (2013.01); *H04L 41/0893* (2013.01)

(58) Field of Classification Search
CPC ............... H04L 29/08072; H04L 29/06; H04L 41/0893; H04L 67/18
See application file for complete search history.

(56) References Cited

U.S. PATENT DOCUMENTS 8,363,556 B2 * 1/2013 Dunn .................. H04L 41/0659
370/242
8,671,135 B1 * 3/2014 Joshi .................. H04L 41/0893
365/200

(Continued)

FOREIGN PATENT DOCUMENTS

KR 10-2015-0009715 1/2015

OTHER PUBLICATIONS

Kwon, Ki-Jung; You, Yong-Duck; Choi, Hoon, "A scalable and effective DDS participant Discovery mechanism", Journal of the Korea Institute of Information and Communication Engineering, 2009, p. 1344-1356.

(Continued)

*Primary Examiner* — Khanh Q Dinh
(74) *Attorney, Agent, or Firm* — Lex IP Meister, PLLC (57) ABSTRACT

Disclosed are a system and method for endpoint discovery based on the Data Distribution Service. The endpoint discovery system includes: a discovery information collecting part that collects first discovery information about a first domain network in which a plurality of endpoints including a first endpoint are interconnected, and that collects second discovery information about the first domain network after a preset period of time after collecting the first discovery information; and an endpoint discovery part that detects a second endpoint that is added to or deleted from the first domain network by comparing the first discovery information and the second discovery information, and that discovers the first endpoint having the same topic information as the second endpoint and transmits information about the second endpoint to the first endpoint.

12 Claims, 4 Drawing Sheets

(56) References Cited

U.S. PATENT DOCUMENTS

| | | | | |
|---|---|---|---|---|
| 9,009,248 B2* | 4/2015 | Kim | H04L 67/10 | 709/200 |
| 9,648,060 B2* | 5/2017 | Ahmed | H04L 65/403 | |
| 9,832,106 B2* | 11/2017 | Thomas | H04L 45/26 | |
| 2003/0177213 A1* | 9/2003 | Wallace | H04L 43/04 | 709/223 |
| 2013/0282853 A1* | 10/2013 | Jun | G06F 9/544 | 709/213 |
| 2015/0055509 A1* | 2/2015 | De Bus | H04L 12/2809 | 370/254 |
| 2015/0149565 A1* | 5/2015 | Ahmed | H04L 65/403 | 709/206 |
| 2015/0188996 A1* | 7/2015 | Park | H04L 45/02 | 709/218 |
| 2015/0278360 A1* | 10/2015 | Kim | G06F 17/30864 | 707/770 |
| 2016/0173654 A1* | 6/2016 | Jun | G06F 9/46 | 709/201 |
| 2016/0380882 A1* | 12/2016 | Thomas | H04L 45/26 | 370/401 |

OTHER PUBLICATIONS

An, Kyoungho, et al. "Content-based Filtering Discovery Protocol(CFDP): scalable and efficient OMG DDS discovery protocol", Proceedings of the 8th ACM International Conference on Distributed Event-Based Systems. ACM, 2014, p. 130-141.

Sanchez-Monedero, Javier, et al. "Bloom filter-based discovery protocol for DDS middleware", Journal of Parallel and Distributed Computing, 2011, p. 1305-1317.

Gunjae Yoon, et al., "Topic Naming Service for DDS", ICOIN 2016 (The 30th International Conference on Information Networking), Jan. 13-15, 2016, Tota Kinabalu, Malaysia.

* cited by examiner

FIG. 4

SYSTEM AND METHOD FOR ENDPOINT DISCOVERY BASED ON DATA DISTRIBUTION SERVICE

CROSS-REFERENCE TO RELATED APPLICATION

This application claims priority to and the benefit of Korean Patent Application No. 10-2016-0004886 filed in the Korean Intellectual Property Office on Jan. 14, 2016, the entire contents of which are incorporated herein by reference.

BACKGROUND OF THE INVENTION (a) Field of the Invention

The present invention relates to a system and method for endpoint discovery based on the Data Distribution Service.

(b) Description of the Related Art

The Data Distribution Service (DDS) is a communication middleware standard that was defined by the OMG (Object Management Group) and that offers communication flexibility, extensibility, and interoperability required for real-time distributed communication environments using a real-time publish-subscribe method of data-centric.

The DDS provides various types of QoS (Quality-of-Service) and constructs various publish-subscribe communication environments using combination of QoS parameters. Also, DDS provides a standard discovery method for participants and endpoints in a data distribution service network to offer compatibility between heterogeneous devices and ensure free participation in or withdrawal from the network.

The standard discovery method for DDS is split into two phases: the Participant Discovery Protocol (PDP) for acquiring information about nodes participating in a network; and the Endpoint Discovery Protocol (EDP) for acquiring publisher and subscriber information that is used for communication based on the acquired node information. The Participant Discovery Protocol (PDP) is transmitted to the network via multicasting or broadcasting, so it is not possible to physically discover participants in areas beyond multicast coverage. Due to this, information about participants in areas beyond multicast coverage is statically registered and used. However, the participant information needs to be modified each time there is a change in the status of participants.

Moreover, nodes within the transmission range of the Participant Discovery Protocol (PDP) deliver information about all publishers and subscribers in a full-mesh topology through the Endpoint Discovery Protocol (EDP). In the full-mesh topology, however, information about endpoints which do not need to be interconnected is delivered to and stored in all nodes. This increases memory usage and creates unnecessary traffic during endpoint discovery.

To solve these problems, there has been research into a variety of participant and endpoint discovery methods, including AN, Kyoungho, et al. "Content-based Filtering Discovery Protocol (CFDP): scalable and efficient OMG DDS discovery protocol", Proceedings of the 8th ACM International Conference on Distributed Event-Based Systems. ACM, 2014, p. 130-141 (hereinafter, 'Conventional Art 1'), Sanchez-Monedero, Javier, et al. "Bloom filter-based discovery protocol for DDS middleware", Journal of Parallel and Distributed Computing, 2011, p. 1305-1317 (hereinafter, 'Conventional Art 2'), Kwon, Ki-Jung; You, Yong-Duck; Choi, Hoon. "A scalable and effective DDS participant discovery mechanism", Journal of the Korea Institute of Information and Communication Engineering, 2009, p. 1344-1356 (hereinafter, 'Conventional Art 3'). According to Conventional Art 1 and Conventional Art 2, problems occurring during the transfer of the Endpoint Discovery Protocol (EDP) can be solved, whereas problems occurring during the transfer of the Participant Discovery Protocol (PDP) are hard to solve. Moreover, according to Conventional Art 3, all the problems occurring during the transfer of the Participant Discovery Protocol (PDP) and Endpoint Discovery Protocol (EDP) can be solved. However, the transmission of non-standard protocols may lead to some difficulties in providing interoperability.

The above information disclosed in this Background section is only for enhancement of understanding of the background of the invention and therefore it may contain information that does not form the prior art that is already known in this country to a person of ordinary skill in the art.

SUMMARY OF THE INVENTION

One aspect of the present invention is directed to providing a system and method for endpoint discovery based on the Data Distribution Service, in which local data distribution service network information, collected by a representative node (front-end node) participating in a standardized data distribution service network, is stored and managed by using topic name nodes in a tree structure.

Another aspect of the present invention is directed to providing a system and method for endpoint discovery based on the Data Distribution Service, in which an endpoint which is added, changed, or deleted from a data distribution service network is detected, an endpoint involved in a topic of the detected endpoint is discovered, and information about the added, changed, or deleted endpoint is transmitted to the discovered endpoint.

An exemplary embodiment of the present invention may be used to achieve other aspects that are not specifically mentioned. An exemplary embodiment of the present invention provides a system for endpoint discovery based on the Data Distribution Service, the system including: a discovery information collecting part that collects first discovery information about a first domain network in which a plurality of endpoints including a first endpoint are interconnected, and that collects second discovery information about the first domain network after a preset period of time after collecting the first discovery information; and an endpoint discovery part that detects a second endpoint that is added to or deleted from the first domain network by comparing the first discovery information and the second discovery information, and that discovers the first endpoint having the same topic information as the second endpoint and transmits information about the second endpoint to the first endpoint.

The discovery information may include a domain number, domain participant information, endpoint location information, and topic information.

The information about the second endpoint may include second endpoint location information and topic information.

The endpoint discovery part may receive and store the first discovery information and second discovery information that are transmitted from the discovery information collecting part.

The endpoint discovery system may further include a discovery information transmitting part that delivers the first discovery information and second discovery information collected by the discovery information collecting part to the endpoint discovery part.

The discovery information transmitting part may include topic name nodes in a tree structure.

The discovery information collecting part may collect location information of the topic name nodes at the lowest layer of the tree structure.

The endpoint discovery part may represent the topic name nodes at the lowest layer of the tree structure.

The discovery information collecting part may collect third discovery information about a second domain network in which a plurality of endpoints including a third endpoint are interconnected, and the endpoint discovery part may discover a third endpoint having the same topic information as the second endpoint in the second domain network and transmit information about the second endpoint to the discovered third endpoint.

Another embodiment of the present invention provides a method for endpoint discovery based on the Data Distribution Service, the method including: collecting and storing first discovery information about a first domain network in which a plurality of endpoints including a first endpoint are interconnected; collecting and storing second discovery information about the first domain network after a preset period of time after collecting the first discovery information; detecting a second endpoint that is added to or deleted from the first domain network by comparing the first discovery information and the second discovery information; and discovering the first endpoint having the same topic information as the second endpoint and transmitting information about the second endpoint to the discovered first endpoint.

The endpoint discovery method may further include collecting and storing third discovery information about a second domain network in which a plurality of endpoints including a third endpoint are interconnected, wherein, in the transmitting of information about the second endpoint, a third endpoint having the same topic information as the second endpoint may be discovered in the second domain network, and the information about the second endpoint may be transmitted to the discovered third endpoint.

The discovery information may include a domain number, domain participant information, endpoint location information, and topic information.

The information about the second endpoint may include second endpoint location information and topic information.

According to one embodiment of the present invention, it is possible to discover an endpoint involved in a topic of an endpoint that is added, changed, or deleted from a data distribution service network and to transmit information about the added, changed, or deleted endpoint to the discovered endpoint.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. Further, detailed descriptions of well-known technologies are not provided.

As used herein, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

As used herein, the term "endpoint" refers to a communication terminal.

As used herein, the term "topic" refers to a predefined data structure, and participants in the Data Distribution Service (DDS) perform data communication by exchanging topics.

As used herein, the phrase "endpoint information" refers to DiscoveredWriterData (sender information) and DiscoveredReaderDate (receiver information) defined in the SEDP (Simple Endpoint Discovery Protocol), and includes endpoint location information, topic information, and QoS (Quality-of-Service) information.

As used herein, the phrase "discovery information" refers to information collected by a front-end node, and includes a domain number, domain participant information, endpoint location information, and topic information.

Figure 1:
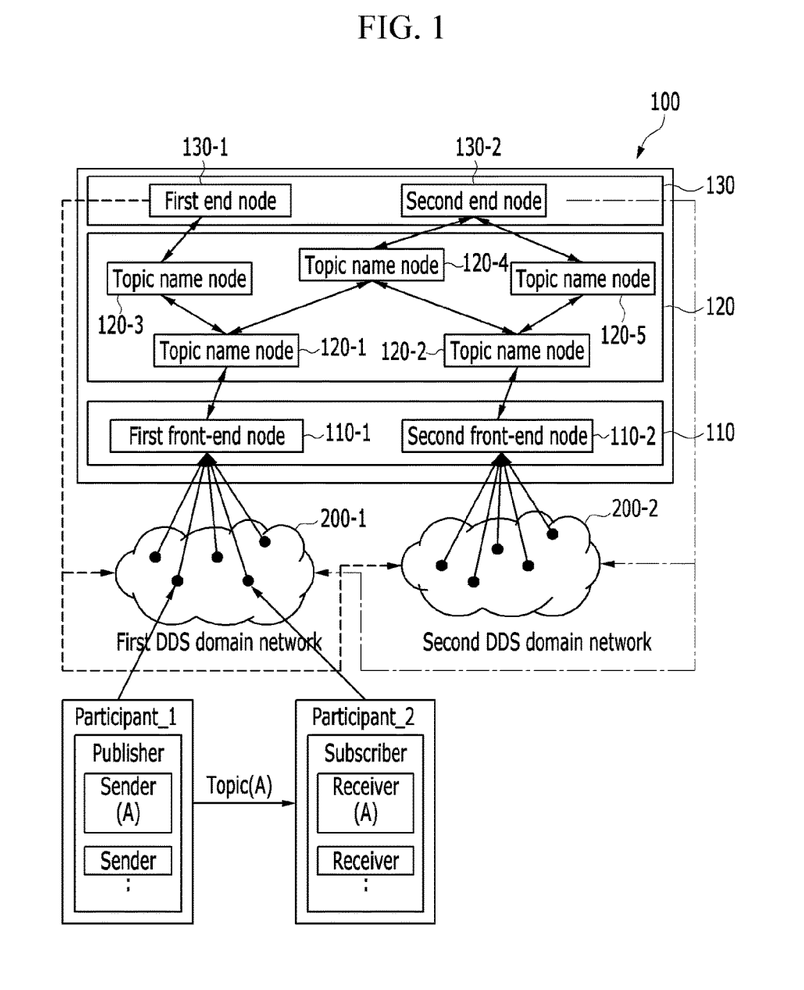
FIG. 1 shows a configuration of a system for endpoint discovery based on the Data Distribution Service according to one exemplary embodiment of the present invention.

FIG. 1 shows a configuration of a system for endpoint discovery based on the Data Distribution Service according to one exemplary embodiment of the present invention.

The endpoint discovery system 100 of FIG. 1 is connected to one or more local data distribution service domain networks 200-1 and 200-2 (hereinafter, "DDS domain networks"), and includes a discovery information collecting part 110, a discovery information transmitting part 120, and an endpoint discovery part 130.

The DDS domain networks 200-1 and 200-2 are networks which are distinguished from each other by their domains, i.e., data sharing areas, and each of them includes one or more participants. The participants include one or more publishers who are involved in publishing data, or one or more subscribers who are involved in subscribing data. A publisher and a subscriber who are involved with each other send and receive data using topics. Specifically, the publisher's built-in sender(DataWriter) sends data on that topic, and the subscriber's built-in receiver(DataReader) receives the data on that topic.

The discovery information collecting part 110 includes front-end nodes 110-1 and 110-2 respectively corresponding to the local DDS domain networks 200-1 and 200-2, and collects information (hereinafter, "discovery information") related to the DDS domain networks 200-1 and 200-2 and transmits it to the discovery information transmitting part 120.

According to the exemplary embodiment of the present invention, the first front-end node 110-1 transmits discovery information of the first DDS domain network 200-1 to the discovery information transmitting part 120, and the second front-end node 110-2 transmits discovery information of the second DDS domain network 200-2 to the discovery information transmitting part 120. The discovery information includes information about endpoints participating in the DDS domain networks 200-1 and 200-2.

A method for discovering participants and endpoints in the DDS domain networks 200-1 and 200-2 will be described below in detail. The description will be given of the first DDS domain network 200-1 by way of example.

To begin with, participants in the first DDS domain network 200-1 transmit DiscoveredParticipantData to other participants in the first DDS domain network 200-1 through the SPDP (Simple Participant Discovery Protocol) to inform them of their presence. In turn, participants receive the DiscoveredParticipantData from other participants and recognize their presence. The DiscoveredParticipantData is predefined in the SPDP, and includes location information for discovery, location information for data transmission/reception, and the QoS of participants.

Thereafter, participants in the first DDS domain network 200-1 send their endpoint information or receive other participants' endpoint information through the SEDP (Simple Endpoint Discovery Protocol). The endpoint information is DiscoveredWriterData or DiscoveredReaderData predefined in the SEDP, and includes endpoint location information, information on topics involved, and the QoS of the endpoint. Specifically, participants transmit DiscoveredWriterData or DiscoveredReaderData via multicasting or unicasting by using the location information for discovery included in the received DiscoveredParticipantData. In this case, participant and endpoint discovery is performed at a preset time, and the discovery information collecting part 110 collects discovery information each time participant and endpoint discovery is performed.

The discovery information transmitting part 120 receives discovery information from the front-end nodes 110-1 and 110-2 and transmits it to the endpoint discovery part 130, and includes topic name nodes 120-1, 120-2, 120-3, 120-4, and 120-5 in a tree structure. According to the exemplary embodiment of the present invention, the topic name nodes 120-1, 120-2, 120-3, 120-4, and 120-5 form a tree structure based on the topic information included in the received discovery information.

The endpoint discovery part 130 represent the topic name nodes at the lowest layer, among all the topic name nodes in the tree structure. These topic name nodes will be called 'end nodes' to tell them apart from the topic name nodes of the discovery information transmitting part 120.

The endpoint discovery part 130 receives and stores discovery information of the entire DDS domain network transmitted through the topic name nodes 120-1, 120-2, 120-3, 120-4, and 120-5 in the tree structure, and includes a first end node 130-1 and a second end node 130-2. According to the exemplary embodiment of the present invention, the endpoint discovery part 130 compares pre-stored first discovery information and newly-received second discovery information to detect an endpoint which is added, changed, or deleted from the DDS domain network. The second discovery information is collected after a preset period of time after the first discovery information is collected. Upon detecting an added, changed, or deleted endpoint, information about the added, changed, or deleted endpoint is transmitted to the DDS domain network 200-1 and 200-1 via unicasting. In this case, an endpoint including a receiver (DataReader) having the same topic information as the added, changed, or deleted endpoint is discovered. Thereafter, the information about the added, changed, or deleted endpoint, i.e., sender information(DiscoveredWriterData), may be transmitted to the discovered endpoint.

The front-end nodes, topic name nodes, and end nodes will be described in detail below with reference to FIG. 2.

Figure 2:
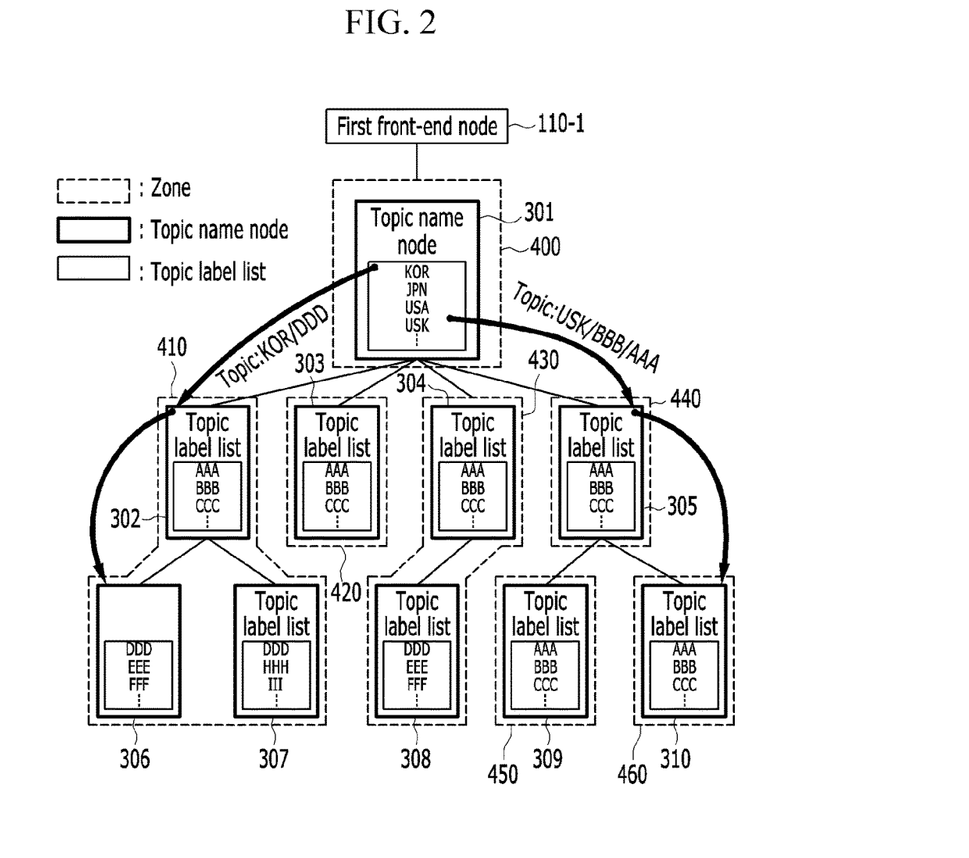
FIG. 2 shows a detailed configuration of the discovery information transmitting part of FIG. 1.

FIG. 2 shows a detailed configuration of the discovery information transmitting part of FIG. 1.

As shown in FIG. 2, topic name nodes 301, 302, 303, 304, 305, 306, 307, 308, 309, and 310 form a tree structure based on the topic names in the topic information included in the discovery information. A topic name includes one or more topic labels, and the far left label separated by a slash corresponds to the highest layer and the right label corresponds to a layer below the left label. For example, a topic name "KOR/CNU/monitoring" is identified by topic labels KOR, CNU, and monitoring, "KOR" corresponds to the highest layer, "monitoring" corresponds to a layer below "CNU", and "CNU" corresponds to a layer below "KOR".

In FIG. 2, the topic name nodes 301, 302, 303, 304, 305, 306, 307, 308, 309, and 310 each include a topic label list. The topic label list includes zero or more topic labels, and topic labels may be added to the topic label list based on the discovery information transmitted from the first front-end node 110-1.

As shown in FIG. 2, one or more topic name nodes 301, 302, 303, 304, 305, 306, 307, 308, 309, and 310 form zones 400, 410, 420, 430, 440, 450, and 460. The root zone 400, which is the start point of the tree structure, includes the topic name node 301 that receives the discovery information transmitted from the first front-end node 110-1. Moreover, the root zone 400 is connected to a plurality of lower zones 410, 420, 430, 440, 450, and 460. Specifically, the first front-end node 110-1 classifies by labels the topic names in the topic information included in the discovery information collected in the first DDS domain network 200-1 and transmits them to the first topic name node 301.

For example, a description will be given of topic labels 'USK/BBB/AAA'. Discovery information is delivered from the first topic name node 301 including an USK topic label at the highest layer to the second topic name node including a BBB topic label at the second highest layer. Thereafter, the discovery information is delivered from the second topic node 305 to the third topic node 310 including an AAA topic label at the lowest layer.

The first front-end node 110-1 of FIG. 2 collects information about the topic name nodes included in the zones 400, 410, 420, 430, 440, 450, and 460. According to the exemplary embodiment of the present invention, the first front-end node 110-1 collects information about the topic name nodes included in the lower zones by using each zone including labels. That is, the locations of end nodes may be stored by recursively collecting the locations of the topic name nodes 306, 307, 308, 309, and 310 at the lowest layer which include topic labels.

A method for discovering endpoints and transmitting endpoint information will be described below with reference to FIGS. 3 and 4.

Figure 3:
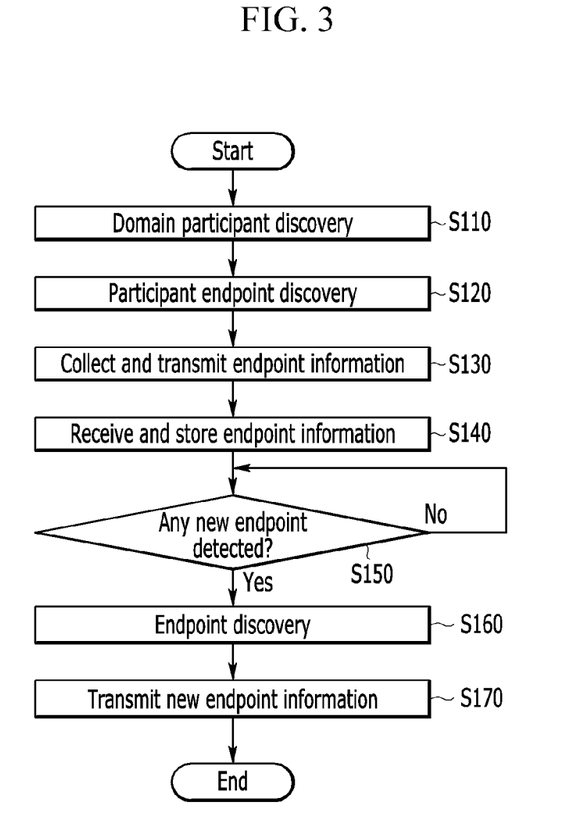
FIG. 3 shows a method for endpoint discovery with reference to FIG. 1.

FIG. 3 shows a method for endpoint discovery with reference to FIG. 1.

To begin with, participant discovery and endpoint discovery are performed on the first DDS domain network 200-1 (S110 and S120). The method for participant and endpoint discovery has been described in detail with reference to FIG. 1, so a redundant description will be omitted.

Thereafter, the first front-end node 110-1 collects discovery information and transmits it to the first end node 130-1 and the second end node 130-2 through the topic name nodes 120-1, 120-3, and 120-4 (S130).

The first end node 130-1 and the second end node 130-2 receive and store the discovery information transmitted in the step S130 (S140). In the step S140, the first end node 130-1 and the second end node 130-2 receive an EDP message, then check the topic labels, and then store the discovery information. Thereafter, the first end node 130-1 or the second end node 130-2 detects information about a new endpoint that participates in the first DDS domain network 200-1 (S150).

Upon detecting endpoint information in the step S150, the first end node 130-1 or the second end node 130-2 discovers endpoints having the same topic information as the endpoint detected in the step S150 in the first DDS domain network 200-1 and the second DDS domain network 200-2 (S160).

Thereafter, the information about the endpoint detected in the step S150 is transmitted to the endpoints discovered in the step S160 (S170).

Figure 4:
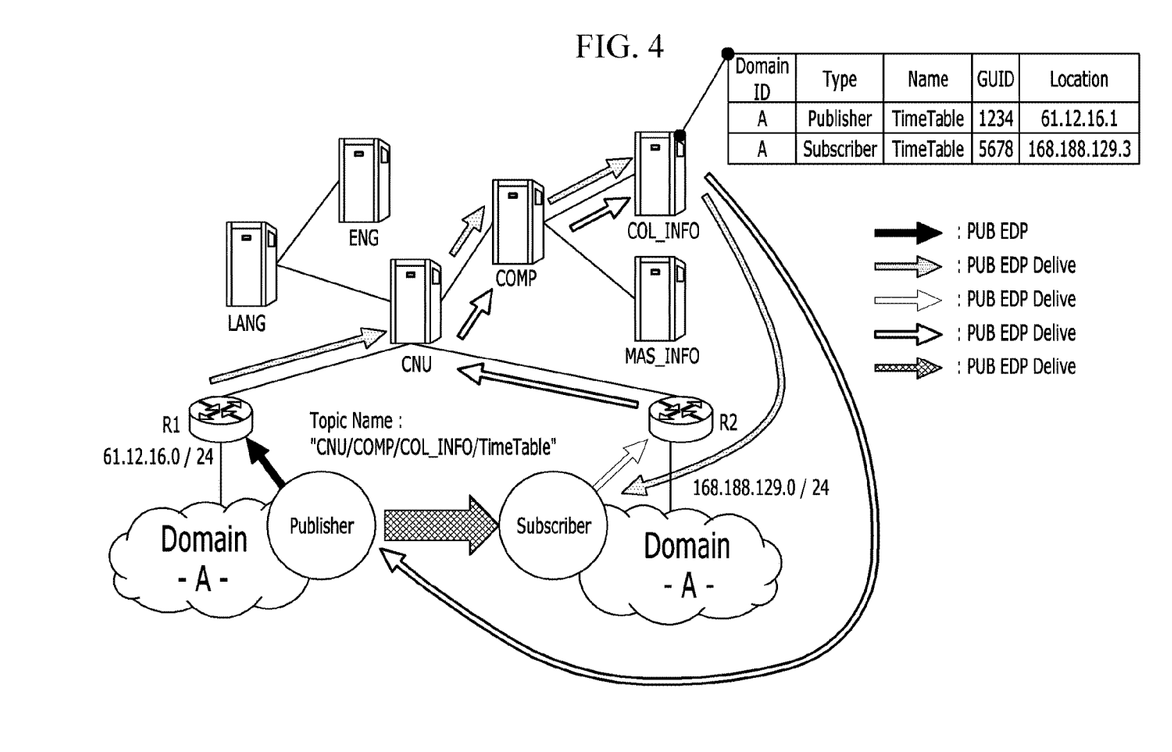
FIG. 4 shows a data transmission/reception process between a new publisher and a subscriber according to one exemplary embodiment of the present invention.

FIG. 4 shows a data transmission/reception process between a new publisher and a subscriber according to one exemplary embodiment of the present invention.

In FIG. 4, an end node COL_INFO stores publisher information and subscriber information that are delivered through topic name nodes CNU and COMP. Upon detecting information about a new publisher with domain A, the end node COL_INFO discovers a subscriber having a topic on which the new publisher is publishing, and transmits the publisher information to the discovered subscriber. Also, information about the discovered subscriber is transmitted to the new publisher. Thereafter, the new publisher transmits published data to the discovered subscriber.

According to the exemplary embodiment of the present invention, discovery information for the entire DDS domain network may be managed by using topic name nodes. Moreover, endpoints within the DDS domain network may be discovered based on topic information, and information about an endpoint which is added, changed, or deleted from the network may be selectively transmitted. This can solve the problem of limited search caused by multicast transmission in the existing Data Distribution Service and the problem of memory and traffic waste caused by the transmission of endpoint information in the full-mesh topology.

One embodiment of the present invention enables participant discovery in a local data distribution service network beyond multicast coverage. Thus, the present invention can be deployed in military training and IoT applications which aim to provide wide area connectivity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: endpoint discovery system
110: discovery information collecting part
110-1, 110-2: front-end nodes
120: discovery information transmitting part
120-1, 120-2, 120-3, 120-4, 120-5: topic name nodes
130: endpoint discovery part
130-1, 130-2: end nodes
200: DDS domain network

What is claimed is:

1. A system for endpoint discovery based on the Data Distribution Service, the system comprising:
 a discovery information collecting part that collects first discovery information about a first domain network in which a plurality of endpoints comprising a first endpoint are interconnected, and that collects second discovery information about the first domain network after a preset period of time after collecting the first discovery information; and
 an endpoint discovery part that detects a second endpoint that is added to or deleted from the first domain network by comparing the first discovery information and the second discovery information, and that transmits information about the second endpoint to the first domain network when the second endpoint is detected, and that discovers the first endpoint having the same topic information as the second endpoint and that transmits the information about the second endpoint to the first endpoint, wherein the discovery information collecting part collects location information of the topic name nodes at the lowest layer of the tree structure.

2. The system of claim 1, wherein the discovery information comprises a domain number, domain participant information, endpoint location information, and topic information.

3. The system of claim 1, wherein the information about the second endpoint comprises second endpoint location information and topic information.

4. The system of claim 1, wherein the endpoint discovery part receives and stores the first discovery information and second discovery information that are transmitted from the discovery information collecting part.

5. The system of claim 1, further comprising a discovery information transmitting part that delivers the first discovery information and second discovery information collected by the discovery information collecting part to the endpoint discovery part.

6. The system of claim 5, wherein the discovery information transmitting part comprises topic name nodes in the tree structure.

7. The system of claim 6, wherein the endpoint discovery part represents the topic name nodes at the lowest layer of the tree structure.

8. The system of claim 1, wherein the discovery information collecting part collects third discovery information about a second domain network in which a plurality of endpoints comprising a third endpoint are interconnected, and the endpoint discovery part discovers a third endpoint having the same topic information as the second endpoint in the second domain network and transmits information about the second endpoint to the discovered third endpoint.

9. A method for endpoint discovery based on the Data Distribution Service, the method comprising:
 collecting and storing first discovery information about a first domain network in which a plurality of endpoints comprising a first endpoint are interconnected;
 collecting and storing second discovery information about the first domain network after a preset period of time after collecting the first discovery information;
 detecting a second endpoint that is added or deleted from the first domain network by comparing the first discovery information and the second discovery information;
 transmitting information about the second endpoint to the first domain network when the second endpoint is detected; and
 discovering the first endpoint having the same topic information as the second endpoint and transmitting the information about the second endpoint to the discovered first endpoint, wherein the discovery information collecting part collects location information of the topic name nodes at the lowest layer of the tree structure.

10. The method of claim 9, further comprising collecting and storing third discovery information about a second domain network in which a plurality of endpoints comprising a third endpoint are interconnected, wherein, in the transmitting of information about the second endpoint, a third endpoint having the same topic information as the second endpoint is discovered in the second domain network, and the information about the second endpoint is transmitted to the discovered third endpoint.

11. The method of claim 9, wherein the discovery information comprises a domain number, domain participant information, endpoint location information, and topic information.

12. The method of claim 9, wherein the information about the second endpoint comprises second endpoint location information and topic information.

* * * * *